US006867753B2

(12) United States Patent
Chinthammit et al.

(10) Patent No.: US 6,867,753 B2
(45) Date of Patent: Mar. 15, 2005

(54) VIRTUAL IMAGE REGISTRATION IN AUGMENTED DISPLAY FIELD

(75) Inventors: Winyu Chinthammit, Seattle, WA (US); Eric Seibel, Seattle, WA (US); Thomas A Furness, III, Seattle, WA (US)

(73) Assignee: University of Washington, Seattle, WA (US)

( * ) Notice: Subject to any disclaimer, the term of this patent is extended or adjusted under 35 U.S.C. 154(b) by 284 days.

(21) Appl. No.: 10/281,517

(22) Filed: Oct. 28, 2002

(65) Prior Publication Data

US 2004/0080467 A1 Apr. 29, 2004

(51) Int. Cl.[7] .............................................. G09G 3/02
(52) U.S. Cl. ......................... 345/8; 359/630; 359/631; 382/148; 382/284
(58) Field of Search ........................ 345/7–9; 359/630, 359/631; 382/148, 149, 284, 294; 73/606, 628; 347/235, 247, 250

(56) References Cited

U.S. PATENT DOCUMENTS

| 4,702,575 | A |   | 10/1987 | Breglia |
|---|---|---|---|---|
| 5,299,063 | A |   | 3/1994 | Fritz et al. |
| 5,575,286 | A | * | 11/1996 | Weng et al. ................ 600/444 |
| 5,596,339 | A |   | 1/1997 | Furness, III et al. |
| 5,659,327 | A | * | 8/1997 | Furness et al. ................ 345/8 |
| 5,701,132 | A |   | 12/1997 | Kollin et al. |
| 5,754,344 | A |   | 5/1998 | Fujiyama |
| 6,097,353 | A |   | 8/2000 | Melville et al. |
| 6,345,129 | B1 | * | 2/2002 | Aharon ....................... 382/284 |
| 6,369,953 | B2 |   | 4/2002 | Melville et al. |
| 6,493,097 | B1 | * | 12/2002 | Ivarsson ...................... 356/630 |
| 6,504,947 | B1 | * | 1/2003 | Nozaki et al. .............. 382/148 |
| 6,570,675 | B1 | * | 5/2003 | Asada ........................ 358/1.7 |
| 2001/0049962 | A1 | * | 12/2001 | Yanagida et al. ............. 73/628 |
| 2002/0093697 | A1 | * | 7/2002 | Spears et al. ............... 358/514 |

OTHER PUBLICATIONS

Kato et al.; Marker Tracking and HMD Calibration for a Video–based Augmented Rality Conferencing System; Proceedings of 2nd IEEE and ACM Int'l Workshop of Augmented Reality 1999, pp 85–94, 10/99.

* cited by examiner

*Primary Examiner*—Amare Mengistu
(74) *Attorney, Agent, or Firm*—Steven P. Koda (57) ABSTRACT

A virtual image is registered among a perceived real world background. Tracking light is scanned into the real world environment, which includes at least one detector pair. A first time and a second time at which the tracking light impinges on the first detector is detected, in which the first time and second time occurs within adjacent scan lines. A time at which a horizontal scan line edge (e.g., beginning of scan line or end of scan line) is encountered is derived as occurring one half way between the first time and the second time. The horizontal location of the first detector then is determined within a specific scan line inferring the scan line edge time. The vertical location of the detector is determined within a scan frame by measuring time duration using the beginning of the frame. By determining a location independently from the temporal resolution of the augmented imaging system, the temporal location of the detector is identified to a sub-pixel/sub-line precision. The augmented image is registered either to a 3D real world spatial coordinate system or to a time domain coordinate system based upon tracked position and orientation of the user.

18 Claims, 6 Drawing Sheets

VIRTUAL IMAGE REGISTRATION IN AUGMENTED DISPLAY FIELD

FEDERAL FUNDING STATEMENT

This invention was made with government support under grant numbers N00014-00-1-0618 and N00014-96-2-0008 awarded by the United States Navy. The government has certain rights in the invention.

BACKGROUND OF THE INVENTION

The present invention is directed to an augmented imaging system with tracking capability. In an augmented imaging system virtual images are rendered over a real-world background. In an augmented retinal imaging system, for example, the real world background light is viewed while virtual imagery is scanned onto a viewer's retina. The viewer sees the virtual imagery among the real world background scene.

SUMMARY OF THE INVENTION

A virtual image is registered among a perceived real world background. Tracking light is scanned into the real world environment, which includes at least one pair of detector surfaces. A first time and a second time at which the tracking light impinges on a first detector surface is detected, in which the first time and second time occurs within adjacent scan lines, typically scanned in opposite directions (e.g., a first scan line and a corresponding return scan line; a return scan line and a subsequent next scan line). The pair of detector surfaces are portions of a common detector or are within separate detectors. A detector with multiple detection surfaces generates a detection response for each such detection surface. Accordingly, each detector surface functions as a detector. The term detector is used functionally herein to encompass a detection surface of a multi-surface detector and a stand-alone detector having one detection surface.

A time at which a detector is temporally located in the horizontal scanning axis is derived as occurring one half way between the first time and the second time. The location of the detector in the vertical scanning axis (line) is determined within a scan frame by measuring time duration from the beginning of the frame (VSYNC) to a time at which the tracking light impinges on the detector. By determining a location independently from the temporal resolution of the augmented imaging system, the temporal location of the detector is identified to a sub-pixel/sub-line precision. By deriving the detector location in this manner, the detector is accurately located even in the presence of characteristic changes in the mechanical resonant scanner (MRS).

One detector in each pair serves as a reference whose location is identified. The other detector in each pair is used to determine the direction at which the scanning is occurring. A single pair of detectors allows the virtual image to be registered in time domain. Registration in the spatial domain with up to six degrees of freedom is obtained by including multiple detector pairs. Computer vision technique is applied to estimate position and orientation at up to six degrees of freedom from multiple sets of detectors. For a hybrid tracking implementation, optical tracking and inertial tracking are performed. The tracking light is implemented as part of the optical tracking system. The inertial tracker is to increase an overall update of the hybrid system. The inertial tracker is subject to drifting error. Accordingly, the optical tracker is implemented to recalibrate the inertial tracker periodically. Prediction algorithms compensate for the overall system latency. Accordingly, a high overall update of the hybrid system contributes to more accurate prediction.

DESCRIPTION OF SPECIFIC EMBODIMENTS

Overview

Figure 1:
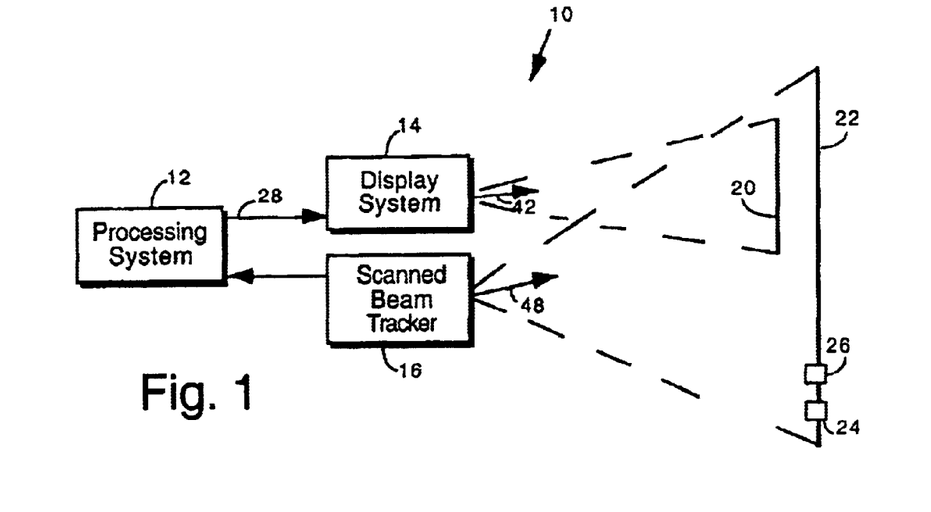
FIG. 1 is a block diagram of an embodiment of an augmented reality imaging system with optical tracking capability.
Figure 2:
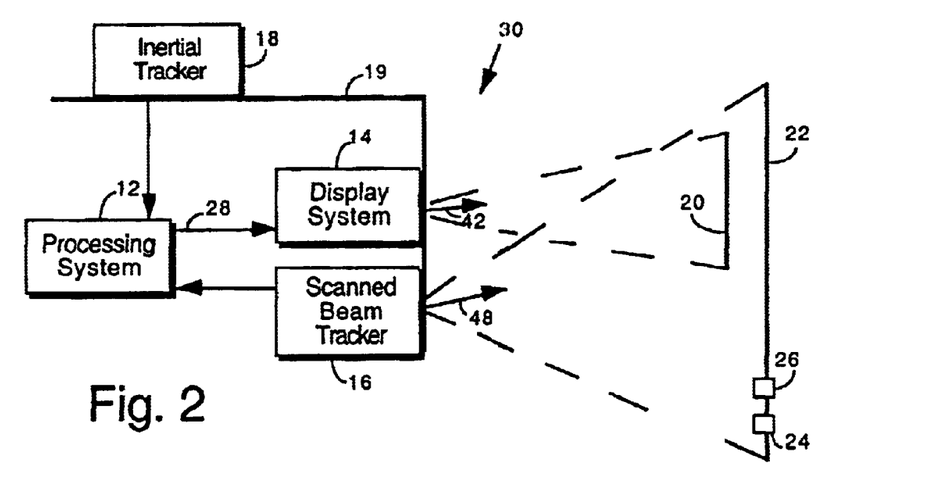
FIG. 2 is a block diagram of an embodiment of an augmented reality imaging system with hybrid optical and inertial tracking capabilities.

FIGS. 1 and 2 show alternative embodiments for an augmented reality imaging system. The augmented reality imaging system 10 of FIG. 1 includes optical tracking to provide accurate augmented image registration relative to the real world background. The augmented reality imaging system 30 of FIG. 2 includes hybrid tracking to provide accurate augmented image registration relative to the real world background. The hybrid tracking includes optical tracking and inertial tracking implementing a higher tracking update rate.

An objective of an augmented reality imaging system is to enhance human interaction with the real world using computer-generated information that is related to real world objects. For example, in a bioengineering application augmented reality information is beneficial in guiding a surgeon during a needle biopsy. The surgeon can look directly at the patient while the augmented imaging system projects an ultrasound image over the real one, allowing for simultaneous examination of an ultrasound image and real image during the operation. As another example, in a flight application, information related to aircraft systems (such as navigation way points) are superimposed and registered through a see-through display over the real world scene as viewed through the augmented display.

To superimpose relevant information over the real world, the display may be mounted on an object in the real world (e.g. automobile dashboard/windshield; aircraft cockpit window), incorporated into a handheld object (e.g., display wand), or mounted on the head/helmet of the user. Although some of the displayed information may present state or graphic information, which is independent of where the virtual images appear in the real world, it is desirable in many augmented reality applications that the display information be precisely stabilized (i.e., registered) relative to the real world. In applications incorporating a head mounted display, the performance of the head tracking system is a critical part of the image stabilization process. It determines the user's viewpoint so that the augmenting virtual image is always aligned relative to the real object.

Augmented Reality Imaging System with Optical Tracking Capability

Referring to FIG. 1, the augmented reality imaging system 10 with optical tracking includes a processing system 12, a display 14, a scanned beam tracker 16, and two or more tracking light detectors 24, 26. In an augmented reality application, the processing system 12 generates an image signal 28, which determines image content that is to augment or overlay a real world scene contemporaneously perceived by a viewer. The display 14 generates the augmented image within a rendering field of view 20. It is desired that the rendered imagery be registered relative to the real world scene. Accordingly, the display position and orientation is tracked. The scanned beam tracker 16 emits tracking light 48 into the external environment along a scanning field of view 22. In various embodiments a rendering field of view 20 does not have to align with a tracking field of view 22. In various embodiments the tracking light is implemented with infrared light or invisible light. The tracking light impinges on the detectors 24, 26. In various embodiments the detectors detect the tracking light and send a signal back to the tracking system 16. In one embodiment, the detectors are reflectors that reflect the tracking light back to the tracker 16. Returning tracking light is detected to determine the display position and orientation. In an alternative embodiment the detectors are sensors, each one of which generates an output signal transmitted to a receiver (not shown) coupled to the processing system 12. In a preferred embodiment the emitted tracking light and the display light share a common aperture. In various embodiments, the imaging system 10 provides tracking capability up to six degrees freedom.

In one embodiment the tracking light and display light are scanned at a common frequency. Sixty hertz is a common refresh rate for display images. Faster refresh rates also are implemented. The 55–60 Hz range is fine for viewing imagery without perceiving flicker. However, for tracking, such refresh rates may not allow for accurate image registration in some augmented image applications. When the real world imagery and display are moving relative to one another at a fast rate, the motion occurring over a scanning period may become significant. Such relative motion detracts from the accuracy of the augmented image registration. One solution is to increase the vertical scanning frequency. Accordingly, in one embodiment the display scanning frequency and the tracker scanning frequency are increased to improve image registration accuracy. The specific frequency selected for operation depends on the application involved. For example, in an aircraft application, there is substantial relative motion between the display and the real world. Accordingly, a very high frequency is used (e.g., 1000 Hz). Such high frequency is used to increase augmented image registration accuracy. The human eye, however, perceives at approximately 60 Hz. As a result, all the extra refreshes to the display are excess. In another embodiment, rather than operate the display at such a high frequency, only the tracker scanning frequency is operated at the high frequency. For example, the inertial tracker described below updates tracking information at more than 1000 Hz, while the optical tracker periodically recalibrates the inertial tracker.

Augmented Reality Imaging System with Hybrid Tracking Capability

Referring to FIG. 2, an augmented imaging system 30 includes a hybrid tracking capability. Hybrid tracking is achieved using optical tracking and inertial tracking. The system 30 includes a processing system 12, a display 14, a scanned beam tracker 16, an inertial tracker 18, and two or more tracking light detectors 24, 26. Components in system 30 performing the same function as corresponding components in system 10 are given the same part numbers. The scanned beam tracker 16 performs the optical tracking function. The inertial tracker 18 performs the inertial tracking function. In one embodiment the display light and tracking light share a common aperture and are scanned at a common frequency.

The inertial tracking tracker 18 includes sensors which are sampled at a faster sampling rate than the scanned beam tracking frequency. The inertial sensors are added to increase the update rate of estimated head positions and orientations. For example, the sensors are sampled at a rate greater than 1000 Hz. In one embodiment the inertial tracker includes three pairs of accelerometers. The basic concept is that the effect of the movement in any translation axis affects a pair of accelerometers in a corresponding axis to have the same direction with equal amount of acceleration. In the opposite way, the movement in orientation effects a pair of accelerometers in a corresponding axis to have the opposite direction with equal amount of acceleration. This basis allows the system to compute one translation axis and one orientation axis from a pair of accelerometers. Three pairs of accelerometers allow the system to obtain the linear accelerations and angular accelerations of the moving stage or the user's head in six degrees of freedom. In one embodiment angular accelerometer or angular rate gyroscope is used to measure the angular velocity. Accordingly the angular acceleration is no longer required.

The inertial sensors enable for an estimated position or motion at a higher throughput than the optical tracker does. The higher sampling rate increases the augmented image registration accuracy. One shortcoming of inertial sensors is a tendency to drift over time. To determine position from acceleration the signal is integrated twice. This double integration makes the inertial sensor highly sensitive to noise. In steady conditions, this noise manifests as a drift in the derived position. Sensor drifting decreases the accuracy of the measured inertial signal over time. By performing hybrid tracking, the optical tracking information is used to calibrate the inertial tracker to filter out the drift. Specifically, the drift only accrues within a single scanning period before being reset.

The hybrid tracking capability allows for a high update rate for determining where to register the augmented image relative to the real world. However, there still is some latency in the registration process due to computational time and sampling time referred as system latency. To further improve augmented image registration accuracy, predictive algorithms within the hybrid tracking system are implemented.

For a head mounted display implementation, a head prediction model is used to account for the system latency. The hybrid tracker output for a current time is being predicted into the future for a future time at which the augmented image is registered for a given display refresh frame. The more accurate the prediction, the better the compensation of the system latency. Once the prediction is computed, the result is used by a rendering process at the processing system 12 to generate the image signal 28 for the display 14. In one embodiment Kalman filtering is performed to implement the hybrid tracking and the prediction algorithms.

Shared Aperture Augmented Reality Imaging System

Figure 3:
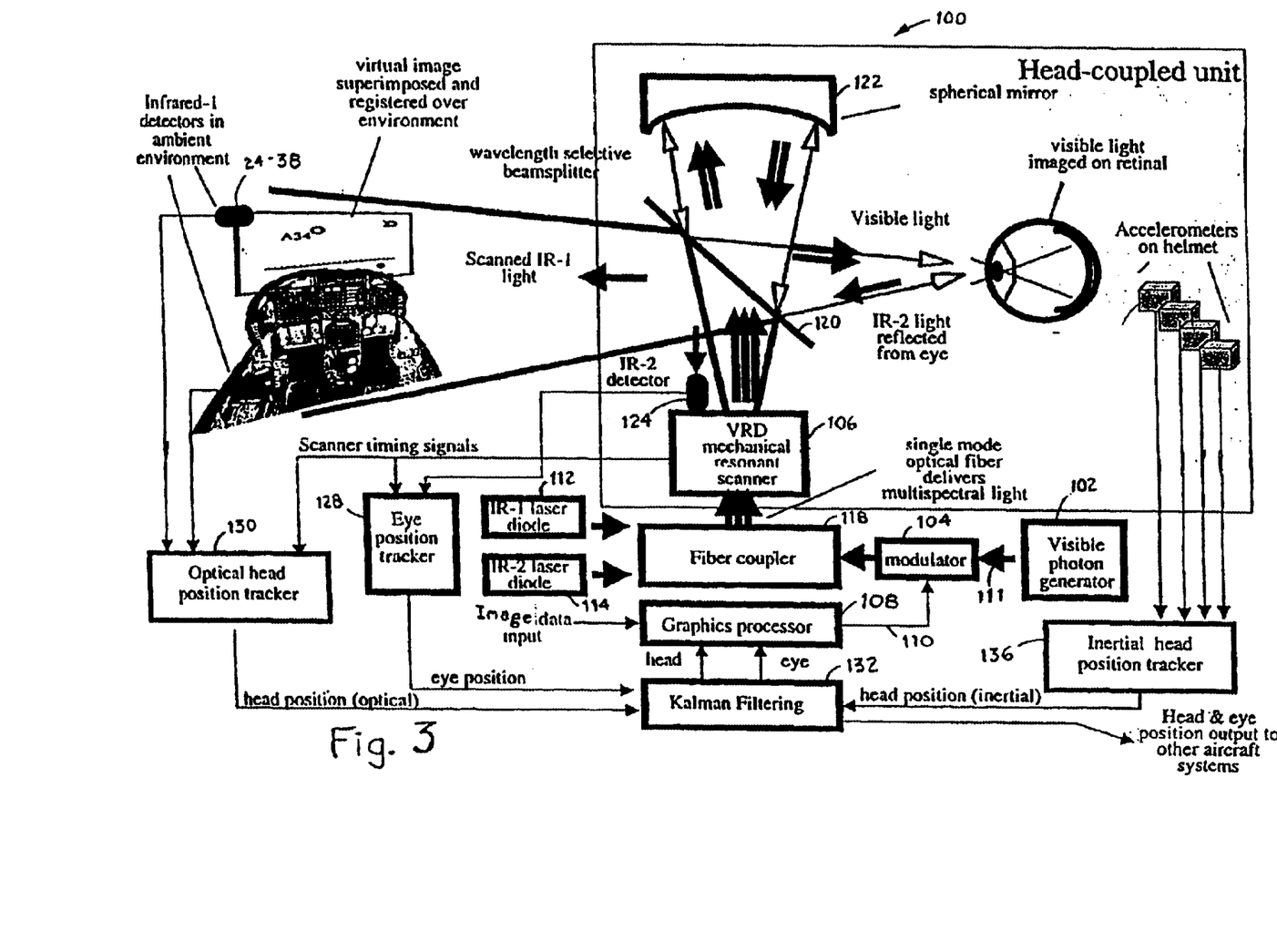
FIG. 3 is a detailed block diagram of a head mounted augmented reality imaging system with eye tracking and hybrid optical and inertial head position tracking.

Referring to FIG. 3, a detailed diagram of a shared aperture augmented reality imaging system 100 is shown with head and eye tracking capabilities. The display portion is formed by a visible light source 102, a light modulator 104 and a virtual retinal display, VRD 106. Image data is input to a graphics processor 108 which generates a signal 110 to the modulator for modulating the visible light. The visible light 111 is in RGB format, although other formats may be used. The optical tracker portion includes one or more infrared or invisible light sources 112, 114, the VRD 106 and a plurality of tracking detection sets 24–38 in the external environment. The tracking light 116 is coupled with the display light 111 by a fiber coupler 118, then fed to the VRD 106. A wavelength-selective beam splitter 120 directs tracking light into the environment for tracking head position. The beam splitter directs the display light and eye tracking light toward a spherical mirror 122 then toward a viewer's eye E. The eye tracking light reflects from the viewer's eye back to the beam splitter and to a detector 124 located with the display. The detector 124 generates a signal input to an eye tracker 128. The eye tracking light is used to track eye position.

The tracking light scanned into the external environment at times impinges the detectors 24–38 which either reflect the light back or otherwise generate a signal to an optical head position tracker 130. The eye position and head position information is fed into a processing system which performs a Kalman filtering process 132. For a hybrid tracking embodiment, inertial sensors 134 generate signals input to an inertial head position tracker 136, which generates head position information that also is input to the Kalman filtering process 132. The Kalman filter uses the head and eye tracking information to estimate head and eye position into a future time at which the next display image frame is scanned on the viewer's eye. The resulting head and eye position information is input to the graphics processor 108 which registers the image data to be scanned to a 3D real world spatial coordinate system or to a time domain coordinate system. A registration process is described in detail below in the section, Tracking and Augmented Image Registration.

Virtual Retinal Display

Referring again to FIG. 3, the VRD 106 scans laser light directly to the retina of the eye to create augmented images. It uses two single axis scanners to deflect a beam of modulated laser light. The vertical scan rate is equivalent to the progressive frame rate. Since the 60 Hz vertical scan rate is relatively low, an existing galvanometer scanner is used as the vertical scanner (Cambridge Instruments). Galvanometers are capable of scanning through wide angle but at frequencies that are much lower than the required horizontal frequencies. In one embodiment, the horizontal scanner is implemented with a mechanical resonant scanner. The only moving part is a torsional spring/mirror combination used in a flux circuit. Eliminating moving coils or magnets (contained in existing mechanical resonant scanners) greatly lowers the rotational inertia of the device, thus a high operational frequency can be achieved. Another unique feature of the MRS is its size (mirror is 2×6 mm). In another embodiment, the entire scanner can be made smaller as a microelectro-mechanical system (MEMS). Exemplary horizontal scanners are described in U.S. Pat. No. 5,995,264 issued on Nov. 30, 1999 to Melville for "Counter-Balanced Optical Scanner", and U.S. Pat. No. 5,694,237 issued Dec. 2, 1997 to Melville for "Position Detection of Mechanical Resonant Scanner Mirror." The contents of such patents are incorporated herein by reference, and made a part hereof.

To extend the field-of-view of the horizontal scanner the scanning mirrors are arranged in one embodiment to cause the beam to reflect twice between the MRS and galvanometer. This approach effectively multiplies the beam deflection by four relative to the actual rotational angle of the horizontal scanner. The scanned beams pass through a wavelength selective beamsplitter 120 (e.g. extended hot mirror) and spherical optical mirror 122 to converge and collimate the visible light at the exit pupil. When the viewer aligns their eye entrance pupil with the exit pupil of the VRD 106, then the viewer perceives a high luminance display at optical infinity that is overlaid onto the natural view of the surrounding environment.

In various embodiments the image light and tracking light have a common aperture. The tracking light and image light are combined by a fiberoptic coupler or by wavelength selective beamsplitter (not shown). The tracking light and image light may be commonly collimated or collimated to different degrees. For example, the image light may collimate at the eye, while the tracking light is collimated toward the surrounding environment. For a wavelength selective beamsplitter embodiment, a converging ten is placed in the image light path prior to the beamsplitter to converge the image light. A collimating ten is placed in the tracking light path prior to the beamsplitter to collimate the tracking light. A common wavelength selective beamsplitter deflects one of the image light and tracking light toward the scanning mirror, while passing the other of the image light and tracking light toward the scanning mirror. For a fiberoptic coupler embodiment, the image light and the tracking light are optically combined using a fiberoptic coupler into a single multispectral light. Accordingly, a wavelength-dependent collimating lens (not shown) is applied to the multispectral light to achieve different degrees of collimation for the image light and tracking light.

Inertial Tracker 18

Referring to FIGS. 2 and 3, the inertial tracker 18 includes inertial sensors (e.g. accelerometers or angular rate gyroscopes) on a helmet 19 or head mounted display. In various embodiments three pairs of linear accelerometers are used to obtain the translation and orientation of the moving head. Each pair is orthogonal to one another. Within each pair, the translation contributes to the same amplitude and direction bias signals for both accelerometers. On the other hand, the orientation contributes to the opposite direction but same amplitude bias signals. The system obtains one translation axis and one orientation axis from each pair. Combining all three pairs of accelerometers provides the complete six degrees of freedom of user's head. To determine the exact position and orientation of the head relative to the real world, the signals from detectors 24–38 and the inertial sensors are digitized and input to the processing unit 12.

Optical Tracker

Figure 4:
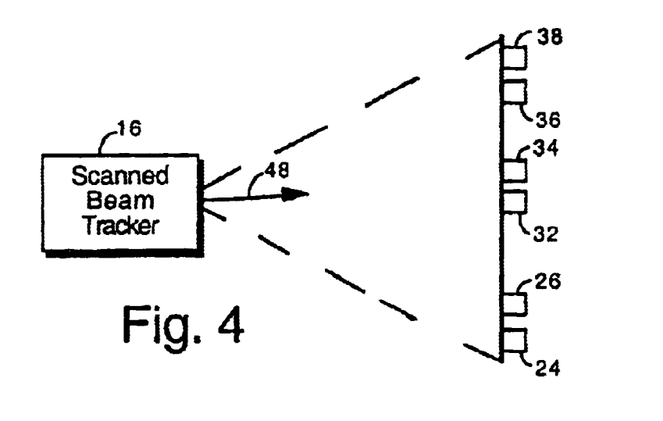
FIG. 4 is a block diagram of an optical scanner configuration for tracking to six degrees of freedom.

Referring to FIG. 4, a six degrees of freedom scanned beam tracker configuration is shown. Six degrees of freedom are achieved by including at least three pairs of tracking detectors 24, 26, 32, 34, and 36, 38. In a given pair of tracking detectors, one detector serves as a reference for tracking position while the other is used to determine which direction the tracking light is scanning in the tracking field of view 22.

Figure 5:
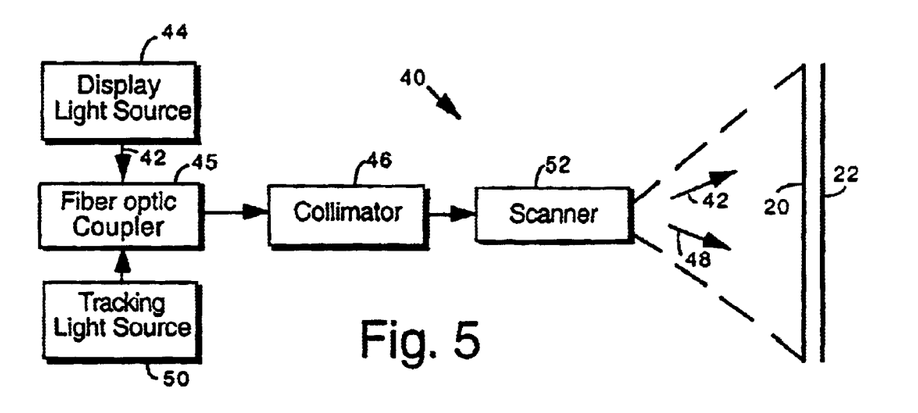
FIG. 5 is a block diagram of an embodiment of a shared aperture augmented display.

Referring to FIG. 5, a shared aperture configuration 40 is shown for a display and scanned beam tracker. In one embodiment display light 42 generated by a display light source 44 is input to a fiberoptic coupler 45. Tracking light 48 generated by a tracking light source 50 also is input to the fiberoptic coupler 45. The combined tracking light 48 and display light 42 resulting in a single multispectral light then passes through a collimator 46. The wavelength-dependent collimator 46 directs the light to a scanner 52. In another embodiment a fiberoptic coupler 45 and the wavelength-dependent collimator 46 are replaced by using a wavelength-selective beamsplitter (not shown) for combining two wavelength beams (infrared and visible) of different degrees of collimation. In both embodiments the scanner 52 deflects the display light 42 along a rendered field of view 20 and directs the tracking light 48 into the external environment along a tracking field of view 22. The rendered field of view 20 and tracking field of view 22 are coincident, partially overlapping, or mutually exclusive in various embodiments.

In some embodiments a quad detector is used instead of a pair of detectors to increase the robustness of the tracker for varying applications. Within a quad detector, total sensing area is quarterly divided into four sensing cells (e.g., four sensing areas). For any horizontal scanning line that impinges on the quad detector, at least two (along the horizontal scanning direction) of the sensing cells can function as a pair of detectors. Accordingly, any techniques implemented on a pair of detectors are also applied to a quad detector.

Tracking and Augmented Image Registration

The process of aligning a virtual image to a specific location in a real world background is referred to herein as augmented image registration, or simply, registration. For example poor registration in a head tracking system may result in a user perceiving the movement of a virtual cup on a real table while they walk around the table looking at what is supposed to be a stationary cup on a real table. Such a registration error greatly compromises the desired sense of reality that the user is to perceive, and thus, greatly compromises the utility of an augmented reality imaging system.

There are two principle sources of registration error: static and dynamic. Static error is defined as an error that occurs while the user is stationary. The sources of a static error include a calibration error and a tracker error. Calibration procedures are used to calibrate a tracking system with a display system so that augmented image is aligned correctly. The calibration parameters associated with the tracking system are transformations among the scanner, sensors, and the real world coordinates. The parameters associated with the display system are the field-of-view and the non-linearity of the scanner. Inaccurate parameters cause systematic errors, which can be compensated by calibration procedures. The static error is also contributed by the tracker error but it cannot be compensated by calibration procedures.

Dynamic error is defined as an error that occurs while the user is in motion. The primary source of dynamic error is system latency. The system latency is defined as the time duration from sensing a position to rendering images. It includes computational time required in the tracking system as well as communication time required between subsystems (i.e. display, trackers, and the processing system). A significant latency causes the virtual image, relative to the real object in the environment, to appear to trail or lag behind during a head movement.

Figure 6:
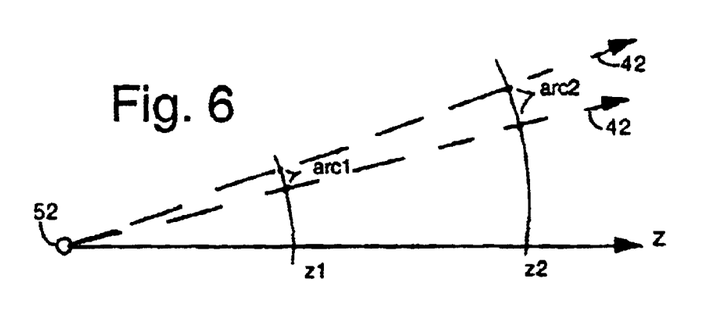
FIG. 6 is a diagram illustrating a single pixel arc length at differing distances away from the scanner.

One solution for registering the augmented image is to identify the pixel being displayed which corresponds to the detection of returning tracking light. For tracking light reflected from less than a specific distance, the round trip time for the tracking light is less than the time it takes the scanning system to deflect display light by one pixel. The processing system receives an indication of tracking light detection and registers a current pixel with such detection. A shortcoming of this approach is that tracking light resolution is limited to one pixel. Referring to FIG. 6, display light 42 is directed out from the scanner 52. Consider the distance from the scanner 52 as being some distance, z. For a tracking light reflector located a distance z1 from the scanner 52, the display light 42 moves along an arc distance arc1. For a tracking light reflector located a longer distance z2 from the scanner 52, the display light 42 moves along a greater arc distance arc2. Because the tracking reflector is being resolved relative to a pixel, the tracking resolution is limited to pixel resolution. As a result, tracking accuracy is vulnerable to increasing z distances. The farther away the tracking light reflector, the less accurate is the registration of the augmented image.

Another challenge with correlating the tracking light detection to a current display pixel is that the current display pixel of a given horizontal scan is not easily correlated. Specifically, for a virtual retinal display having a resonant scanner for directing display light and tracking light, identifying a current pixel along a horizontal scan line corresponding to the detection of tracking light is a challenge. Specifically, it has been found that the mechanical resonant scanner MRS has a resonant frequency which varies over time. In particular there is a phase shift occurring over time between the physical characteristic of the resonant scanner and the horizontal synchronization signal of the display. This means that the current pixel within a scan line is not accurately known with precision when the tracking light is detected. Even if calibration procedures are performed to correlate a given pixel to a specific deflection angle of the horizontal scanner, the changing MRS characteristic soon makes the calibration invalid.

An alternative approach is to identify the detection of tracking light in time independent of the horizontal synchronization signal of the scanner, while compensating for the phase shift in the MRS characteristic. Rather than reference to the horizontal synchronization signal, a reference is passively inferred as being one half way between a first detection and a subsequent second detection of a detector occurring within adjacent scan lines, (e.g., between a scan in line direction and a returning scan in the opposite direction). By determining the reference time in this manner the reference automatically adjusts to the effect of a phase shift or other changes in MRS characteristics.

Since multiple light scan lines are likely to be detected in each scanned frame, the time between each tracking light detection/reflection pulse determines the general location within the scan line. With only one detector, the direction of the horizontal scan when the beam first hits the detector in any given frame (such as going from left to right or vice versa) is arbitrary. Therefore, a second detector is placed to the side of the first detector along the horizontal scan axis, creating multiple tracking light reflection pulses. The first and second detectors form a detector pair. Since the scanned beam strikes the two detectors sequentially in time, the scan direction can be determined by the sequence of detection events.

To obtain a precise horizontal location within the scan line, one of the two detectors is chosen as the reference.

Figure 7:
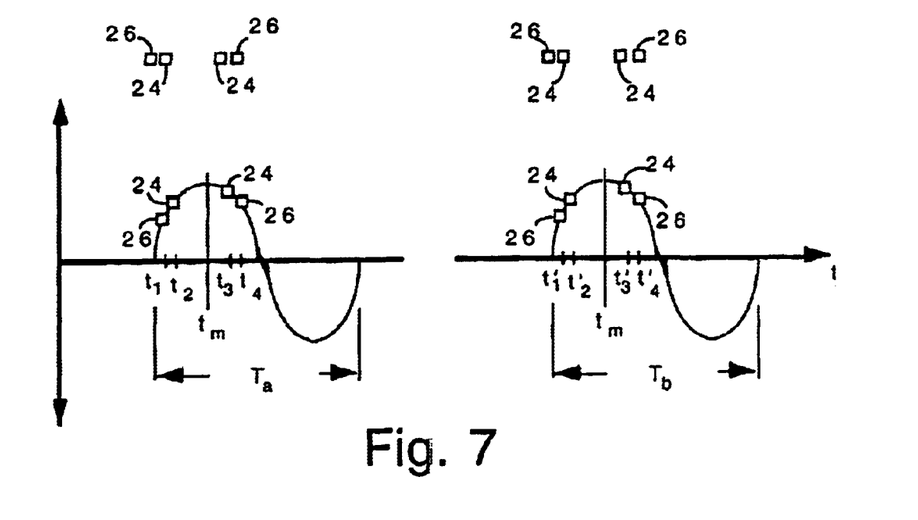
FIG. 7 is a graph of time versus deflector angle illustrating a scanner phase shift among different scanning periods.
Figure 8:
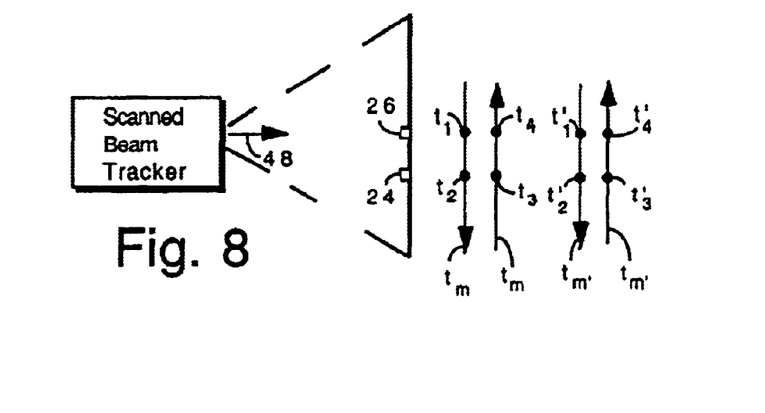
FIG. 8 is a diagram of the scanned beam tracker field of view at times corresponding to the graph of FIG. 7.
Figure 9:
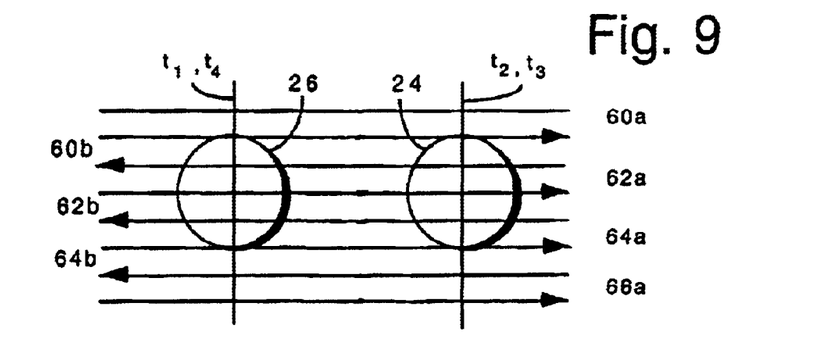
FIG. 9 is a diagram of multiple scan lines impinging on a detector pair during multiple scan lines.

Referring to FIGS. 7–9, detector 24 is the reference and the timing regiment is when the tracking light 48 strikes detector 24 to when the tracking light 48 next strikes detector 24. Referring to FIG. 7, the horizontal axis is time and the vertical axis is a deflection angle of the horizontal scanning mirror, MRS. At time t1 tracking light impinges upon detector 26. At time t2 tracking light impinges upon detector 24. The mirror reaches a maximum deflection angle at the end of the horizontal scan, then scans in the opposite direction for the return horizontal scan line. During such return, tracking light impinges first on detector 24 at time t3, then on detector 26 at time t4. The time interval t2 to t3 for the successive impingements of detector 24 is taken to be twice as long as the time from detector 24 to either one of the actual start or actual end of the horizontal scanner mirror deflection scan path. The corresponding horizontal location of the detector 24 within the scan line is then calculated by dividing the time interval t2 to t3 in half. In this way the beginning (or end) of the scan line is inferred to be at time tm, and the location of detector 24 along the horizontal line relative to that beginning (or end) is determined.

The above detector tracking events occur within a single period Ta of the horizontal scanner, MRS. As previously discussed, the resonant frequency of the MRS changes over time causing a phase difference between the horizontal synchronization signal of the display and the mirror position of the scanner. Still referring, to FIG. 7, for a scanner period Tb later in time the scanner frequency may have changed. Accordingly, the scan period Tb is not equal to the scan period Ta. Correspondingly, time interval t1 to t2 is different than the time interval t1' to t2', and the time interval t3 to t4 is different than the time interval t3' to t4'. More significantly, the time interval t2' to t3' differs slightly from the time interval t2 to t3. However, the midpoint of the time interval t2' to t3' still represents either one of the actual start or actual end of the horizontal scan line. Thus, the corresponding horizontal location of the detector 24 within the scan line for period Tb is still accurately determined by taking half of the time interval t2' to t3'. Accordingly, the time that the reference detector 24 is detected relative to a start or end of a scan line is determined independent of the horizontal synchronization signal and of scanner phase shift.

By performing such tracking for another pair of detectors 32, 34, the location of the display relative to the real world is determined for more degrees of freedom. By performing such tracking on at least three pairs of detectors 24, 26, 32, 34, 36, 38, the location of the display relative to the real world is determined for up to 6 degrees of freedom, allowing tracking in position and orientation.

Referring to FIG. 9, since several scan lines 60–64 are likely to pass by the detector 24, multiple events are collected. In one embodiment, the middle event of multiple events is used. Where there is an even number of events, an interpolation is performed for the two middle events to determine the horizontal location of the raster relative to the centroid of the detector 24.

To determine the vertical orientation of the display relative to the detectors 24–38, the raster lines from the top of the display frame to the instant a line passes a detector are counted. Given the instantaneous vertical field-of-view of the display, the line count accurately determines how far down the frame the display has scanned when a detector is reached. Since several scan lines 60–64 may reach a given detector (see FIG. 9), an analysis of successive scan lines allows the processor to pick the middle line or interpolate between lines to track in the vertical scan direction.

Figure 10:
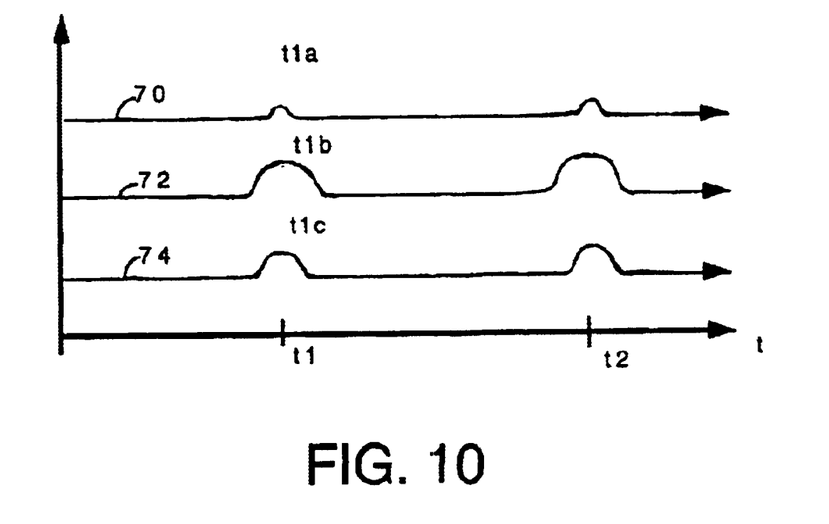
FIG. 10 is a graph of detector output for a pair of detectors during multiple scan lines.
Figure 11:
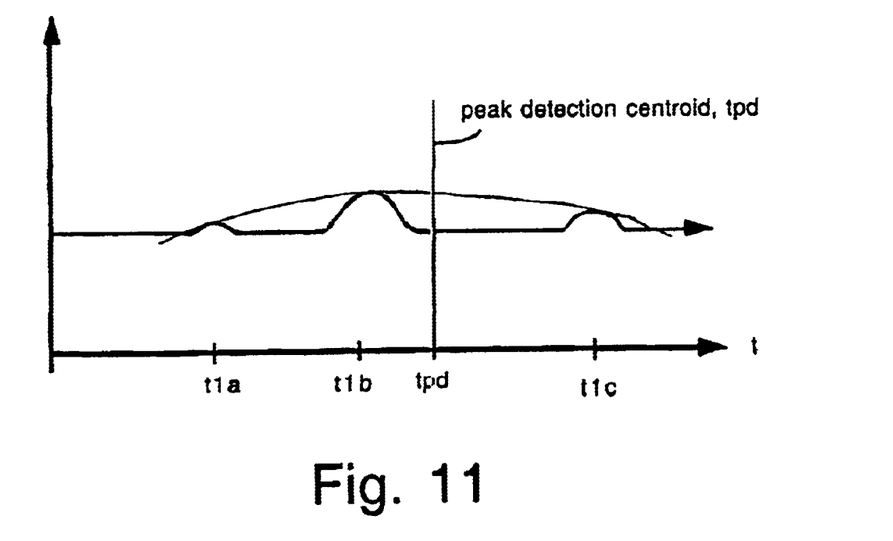
FIG. 11 is a graph of a detector output with a Gaussian envelope illustrating a peak detection centroid time.

To achieve accurate sub-line resolution or precision, the relative intensities of the detected tracking beam are recorded over time for one detector 26 or both detectors 24, 26 of a given detector set. FIG. 9 shows scan lines 60–64 scanning detectors 24, 26. For scan line 60 the tracking beam moves across the detector 26 at time t1 and across detector 24 at time t2 while scanning in one direction. During the return scan the tracking beam moves across detector 24 at time t3 and across detector 26 at time t4. FIG. 10 shows the detector 24 and 26 output for three scan lines 60a–64a. Waveform 70 depicts the outputs of detectors 24, 26 for scan line 60a. Waveform 72 depicts the detector 24, 26 outputs for scan line 62a. Waveform 74 depicts the detector 24, 26 outputs for scan line 64a. When the tracking beam is less centered over the detectors 24, 26 as for scan line 60a, the captured photon flux and corresponding detector output signals 70 are proportionally less than when the tracking beam and detectors are more aligned, such as in scan line 62a (see corresponding output signals 72). A peak detection scheme is implemented to identify the time when the beam and reference detector 26 are most aligned. The location in time of the peak detector signal relative to less centered detectors provides sub-line precision of the detector assembly with respect to the scanned tracking beam of light (see FIG. 11). Such schemes accomplish tracking the scanning light to a sub-pixel accuracy in the relative time domain in both a vertical and horizontal (e.g., scan line) orientation. Referring to FIG. 11 a Gaussian profile is assumed to fit the envelope of multiple scan lines over time, although other mathematical profiles may be implemented.

A detector's 24–38 two-dimensional horizontal and vertical location within the raster scan provides a time based tracking capability which allows accurate registration of augmented imagery relative to the detectors 24–38. To overlay augmented imagery relative to locations in the real world other than the detectors, a transformation from the time detection to a real world spatial domain is performed.

To register an image pixel in 2D space relative to a given reference detector 24, 32 or 36, the pixel line (pixel, line) coordinates are determined relative to the reference detector 24, 32 or 36. For the pixel calculation, the horizontal timing is divided by a pixel clock (~40 ns/pixel) to obtain the corresponding pixel location. For the line calculation, the vertical timing is used to directly calculate the corresponding line location by dividing by the scan-line time duration.

Once the 2D coordinate, (pixel and line), is detected, the tracking/display system can use the time coordinate to superimpose an image pixel onto the reference detector, but cannot accurately use the time coordinate to superimpose a pixel elsewhere (like a few mm in a specific direction beside the detector). A solution is to translate this 2D coordinate (in time domain) into the coordinate in the spatial domain (like mm). However one pair of detectors is not adequate for such translation. Multiple detectors are used. Triangulation techniques then are used to estimate the position and orientation in the spatial domain for 6 DOF (x,y,z, pitch, roll, yaw). Thus, to register an image pixel in the 3D space of the augmented imaging system, the pixel is registered first in the 2D time domain (pixel, line) relative to each of the reference detectors. The more reference detectors, the more degrees of freedom within which the pixel can thereafter be accurately registered in the 3D space of the imaging system. For applications where either the display 14 and tracker 16 are fixed in real world space, or the detectors 24–38 are fixed in real world space, the 3D space of the augmented reality system is correlated to 3D real world space using the triangulation techniques.

In applications where the display or the detectors move relative to the real world space, an additional step is performed to correlate the six degrees of freedom of the augmented reality system to the 3D real world space. In such an application, where the distance from the display to each detector is unknown, while the distances among reference detectors (e.g., detector 24,32,36) are known, computer vision techniques are implemented to correlate to the 3D real world. The reference detectors are located in a 2D coordinate (pixel and line) through a given image frame. Each detector's 3D position in the real world and the corresponding 2D coordinate relative to the tracker 16 are taken to lie along the same ray formed by a tracking light projection within the tracker field of view. In such case an optimization process is used to perform the correlation.

In one embodiment four detectors are configured in a square, with each detector at a vertex of the square. Using the fact that there are two sets of parallel sides and that the direction vectors perpendicular to each other, an image analysis algorithm is used to estimate the position and orientation of the tracker 16 with respect to the square plane. The optimization process is applied to compensate for the error in detected vertices coordinates that cause the direction vectors of the two parallel sides of the square not to be perfectly perpendicular to each other.

Figure 12:
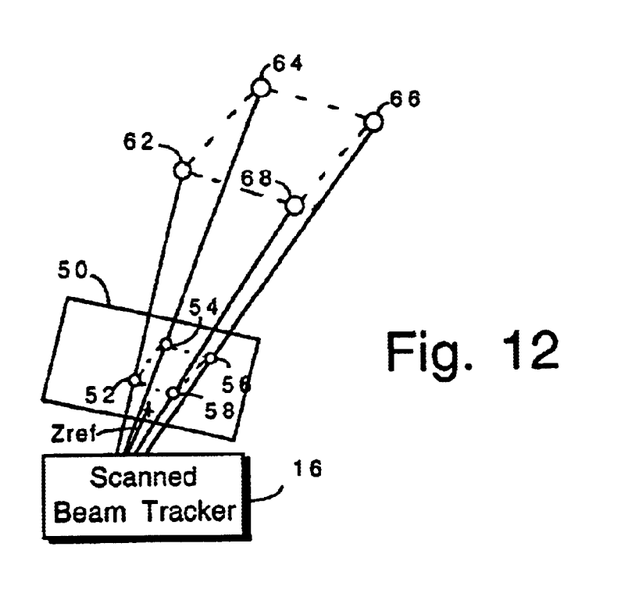
FIG. 12 is a diagram of an optical tracker having four detectors configured in a square.

Referring to FIG. 12, out-looking from the tracker 16 is a reference 2D plane 50 at a fixed distance $Z_{ref}$, which is an imaginary distance away from the origin of the tracker 16 coordinate. The choice of $Z_{ref}$ does not affect the overall tracking accuracy. A projection of four vertices 52, 54, 56, 58 from detector sets 62, 64, 66, 68 on the reference 2D plane 50 represents vertices. In one embodiment, each detector set consists of a pair of detectors. In another embodiment, each detector set consists of a single quad detector. Since a 2D coordinate is defined relative to the tracker coordinates, the horizontal and vertical coordinates are directly obtained from {pixel, line} coordinates in the time domain. The 2D coordinates (or displacements) of four vertices on that plane can be calculated by the following equations:

$$Displacement_{horizontal}(t) = -\frac{K_x}{2}\cos(2\pi freq_x t_x) \quad (1)$$

$$Displacement_{vertical}(t) = K_y \cdot t_y \cdot freq_Y - \frac{K_y}{2}$$

The subscripts {x,y} are defined as the directions along the horizontal scanner's (e.g. MRS) moving axis and the vertical scanner's (e.g., galvanometer) moving axis respectively. Therefore {x,y} can also be referred to as the directions in the horizontal and vertical axes of the augmented system scan. The {t} is the timing measurement in both axes or {pixel, line} coordinates from detections in time domain. {Displacement} is a calculated position in respective axes although their calculations are derived differently for horizontal and vertical axes. The calculation of the horizontal displacement is modeled to correct for the distortion of the sinusoidal nature of the scanner. While a linear model is used in the calculation of the vertical displacement due to a linearity of the galvanometer motion. The displacement at the center of the scan is set to (0,0) for convenience purposes. The {K} is the displacement over the entire FOV of the scanner in respective axes at the distance $Z_{ref}$. The {freq} is the scanning frequency of both scanners.

Once the 2D position (Displacement) of each vertex has been determined, an image analysis algorithm is used to determine the translation and orientation of the square plane with respect to the scanner. In conclusion, the above equations transform 2D coordinates in time domain to 2D positions in the spatial domain.

Alternative Embodiments

In a head mounted display, a holographic visor is included in an alternative embodiment which does not require optical beamsplitting for an augmented imaging.

Retro-reflectors may be placed in a surrounding cockpit, allowing the active tracking detectors or their collection optical fibers to be placed at the optical scanner for head tracking.

The tracking light is frequency or amplitude modulated at a fixed rate or at a varying rate to uniquely identify each pixel position during one raster scan. In other words, for each pixel of display light output, there is a corresponding unique "fingerprint" pattern of tracking light. The fixed rate modulation can be used to add additional signal filtration such as lock-in amplification of weak retro-reflected head or eye tracking signals. The unique 'pixel modulation fingerprint' can be used to discern which pixel is being detected by the detectors 24–38.

An additional tracking light source and scanner can be added to the optical system for eye or head tracking. For example, a micro-optical CMOS camera may be added within the head-mounted display to image the eye with pre-conditioned IR light (e.g. polarized or modulated) that has higher frame rates than the visual display.

Figure 13:
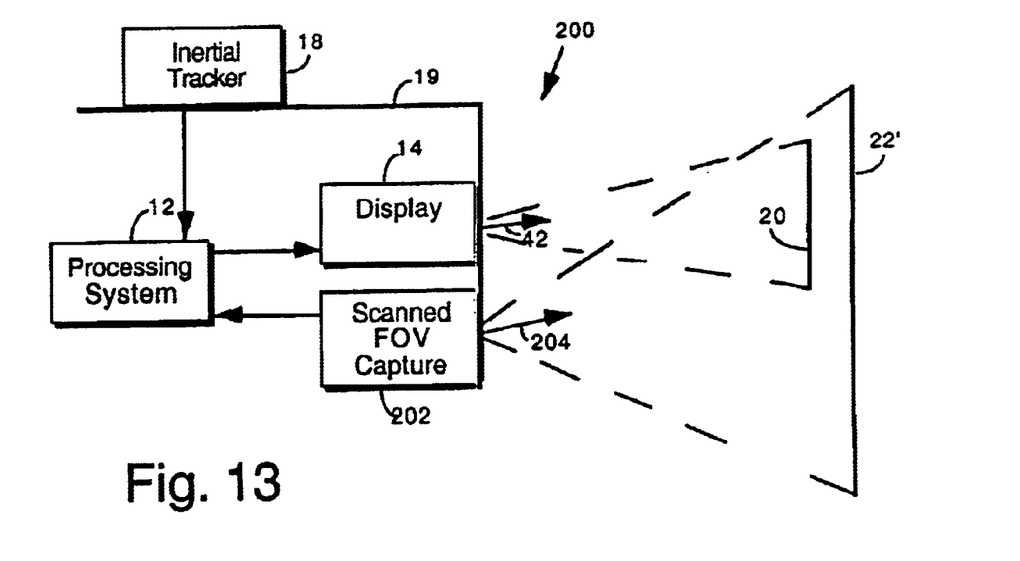
FIG. 13 is a block diagram of an alternate embodiment of an augmented reality imaging system in which points in optically captured image frames of the real world are used to select and tracked in order to register a virtual image.

Referring to FIG. 13, in another augmented reality imaging system embodiment 200 the tracker 16 is replaced with an optical scanning system 202 which captures light 204 from the environment. The captured light is recorded to form a sequence of image frames. Image frames are processed using image processing techniques, such as object selection and object tracking techniques. Real world objects not placed-into the environment for the purpose of being detectors, in effect, serve the function as the detectors 24–38 of the systems including the scanned beam tracker 202. These detectors or reference points are tracked over time or changed to provide reference for registering virtual imagery among the real world scene perceived by the viewer.

Non-augmented mode applications are possible with interactive optical scanning technologies. However, the high accuracies and low latencies required for augmented mode display overlays are no longer necessary, but may still be preferred over standard virtual reality display and tracking technologies. The augmented mode display need not be worn on the head, especially if a large translucent screen is in front of the viewer, such as in a cockpit. The interactive optical scanning display technologies discussed in this application can be used with large screens that do not move with the head or body.

Other 'cockpit' applications, such as operating tank, submarine, and all-terrain vehicles also may be implemented. In navigating and fighting situations, the volume and speed of information that needs to be processed by the pilot is extremely high. Other operations are also very important, such as automating and augmenting the aiming mechanism. Currently, the aiming procedure requires a manual initiation of the detector tracking system. The procedure is inefficient considering the circumstances. The proposed application is perfect fit in these situations. The (military) target acquisition system generates the target's positions relative to the vehicle coordinates. Effortlessly the system superimposes the target positions relative to the user on the display frame. This allows the pilot to quickly fire at the target and also to have more time to concentrate on any other necessary procedure, like navigating the vehicle. Most likely the display is using the augmented mode of a HMD when the pilot is within the vehicle. However, the same functions can be incorporated into a very different interactive display for autonomous vehicles, such as panoramic displays that are not augmented.

Novel computer interface—The current human computer interface restricts the human to have to concentrate on the output device such as a display monitor at all times. This interface limits the human ability to access the information in a more natural way, such as in wide fields of view and in stereo. The proposed application provides the user a more user-friendly interface by allowing the user to interact with the computer through head, eyes, and hands. The head tracking ability allows the user to virtually have an unlimited-size monitor. The interface can be practically anywhere in the surrounding workspace. The mouse is replaced either by hand gestures or eye movements. The user can put the unfinished work in the one physical space as one is used to do the same with books. The new interface is capable of revolutionizing the way people use the laptop. The remaining hardware of the laptop is used as the tracker reference. The user decides at where they want the information to be presented and how they want to interface with the computer.

Repair guide system—The typical manual to guide repairs for machinery, appliances, etc., is not optimally user friendly. For example, the user of a copy machine finds it extremely difficult to repair the machine even though a trained technical person may be directing them over the phone. The proposed system allows the company to create a step-by-step repair manual that shows you what to do exactly and where to do it precisely while you are looking at the machine in the augmented display mode. Since every machine component has a known relative location, the complete system can be mapped in the coordinates space. The tracking system then reorients and remaps the superimposed image to be aligned exactly with the real component. The repair manual is demonstrated by showing the procedure with the overlay image on the real part. There is no priori training required for the customer.

Automobile safety tool—Recently, there has been more safety features available for the automobile consumer, such as the infrared imaging and visual redisplay of the road conditions, Global Positioning System locating, Range finding from sensors within the car. The proposed interactive display system blends in the information from those devices into the augmented visual field of view. Many circumstances are similar between automobile driver and airplane pilot. The way to represent critical information to the user is crucial. If the driver sees where the potential problem is located on the road without having to move their head away from the task at hand (navigating the vehicle), the quality of the decision-making may be significantly higher. The proposed augmented display system quickly alerts the driver to any unexpected potential problem, such as a car approaching from the side. This safety information can be presented from the on-board sensors or from a central highway traffic facility.

Many modifications and variations of the present invention are possible in light of the above teachings. Thus, it is to be understood that, within the scope of the appended claims, the invention may be practiced otherwise than as described above.

What is claimed is:

1. A method of registering a virtual image among a perceived real world background, comprising:
    scanning tracking light into the real world environment;
    detecting a first time and a second time of impingement of the tracking light onto a first detector surface within the real world environment, said first time and second time occurring within adjacent scan lines;
    determining a scan line edge time to be one half way between the first time and the second time;
    defining the first detector location to a sub-pixel precision within a specific scan line based upon said first time and second time and
    registering the virtual image among the real world background using the first detector location as a reference within said real world background.

2. The method of claim 1, further comprising:
    detecting an amplitude of a first detector surface signal for multiple scan lines, and integrating the detected amplitude over the multiple scan lines to define the first detector location to a sub-line accuracy.

3. The method of claim 1, wherein said detecting, determining and defining are performed for a second detector surface and a third detector surface to define a second detector location and a third detector location, wherein said first detector surface, second detector surface and third detector surface are part of physically separate detectors; said registering comprising registering the virtual image with six degrees of freedom among the real world background using the first detector location, second detector location and third detector location as references within said real world background.

4. The method of claim 1, wherein adjacent scan lines are first adjacent scan lines and said specific scan line is a first specific scan line, and further comprising:
    detecting a first time and a second time of impingement of the tracking light onto two additional detectors within the real world environment, said second detector first time and second time occurring within second adjacent scan lines;
    determining a scan line edge time between said second adjacent scan lines to be one half way between the second detector first time and the second time;
    defining the second detector location to a sub-pixel precision within a second specific scan line based upon said first time and second time; and
    registering the virtual image among the real world background with up to six degrees of freedom using the first detector location, second detector, and third detector location as references within said real world background.

5. The method of claim 1, in which said scanning is performed by a scanner, and further comprising:
    tracking inertial movement of the scanner within the real world to define a spatial coordinate transformation between the scanner and the real world environment; and
    calibrating the inertial tracking periodically based upon the defined first detector location.

6. The method of claim 1, further comprising:
    scanning visible light along a plurality of scanning lines to generate the virtual image, wherein visible light output for a scan line is synchronized with a synchronization signal, said first detector location identified to sub-pixel accuracy by being identified independent of the synchronization signal.

7. The method of claim 6, wherein said visible light scanning and tracking light scanning are performed by a common scanner, said scanner subject to a phase drift of the scanning frequency, wherein said first detector location is identified to sub-pixel accuracy by identified being independent of the phase drift.

8. An augmented imaging system, comprising:

a scanner which scans tracking light into a real world environment;

means for detecting a first time and a second time of impingement of the tracking light onto a first detector within the real world environment, said first time and second time occurring within adjacent scan lines;

means for determining a scan line edge time to be one half way between the first time and the second time;

means for defining the first detector location to a sub-pixel precision within a specific scan line based upon said first time and second time; and means for registering the virtual image among the real world background using the first detector location as a reference within said real world background.

9. The augmented imaging system of claim 8, in which the detecting means detects a first time and a second time of impingement of the tracking light onto a first detector; said determining means determines a second detector scan line edge time to be one half way between the first time and the second time; said defining means defines two additional detector locations to a sub-pixel precision within a specific scan line based upon said additional detectors first time and second time; and said registering means registers the virtual image among the real world background with up to six degrees of freedom using the first detector location, second detector location, and third detector location as references within said real world environment.

10. The augmented imaging system of claim 8, further comprising:

means for tracking inertial movement of the scanner within the real world to define a spatial coordinate transformation between the scanner and the real world environment; and means for calibrating the inertial tracking periodically based upon the defined first detector location.

11. The augmented imaging system of claim 8, in which the scanner scans visible light along a plurality of scanning lines to generate the virtual image, wherein visible light output for a scan line is synchronized with a synchronization signal, said first detector location identified to sub-pixel accuracy by being identified independent of the synchronization signal.

12. The augmented imaging system of claim 11, wherein said scanner is subject to a phase drift of the scanning frequency, and wherein said first detector location is identified to sub-pixel accuracy by being identified independent of the phase drift.

13. The augmented imaging system claim 8, further comprising:

means for detecting an amplitude of a first detector signal for multiple scan lines, and means for integrating the detected amplitude over the multiple scan lines to define the first detector location to a sub-line accuracy.

14. An augmented imaging system, comprising:

an image source which generates image light modulated to create virtual image content;

a tracking light source which generates tracking light;

a scanner receiving the image light and the tracking light, the scanner deflecting the image light along a horizontal scan line, the image light being synchronized relative to a horizontal synchronization signal, the scanner concurrently deflecting the tracking light while deflecting the image light along the horizontal scan line, wherein a phase difference between the horizontal synchronization signal and the scanner frequency is subject to drift;

a plurality of detector pairs situated within the real world environment, each one of the plurality of detector pairs including a reference detector and another detector;

a detector which detects for each detector pair a first time and a second time of impingement of the tracking light onto each one reference detector, and detects impingement of the tracking light onto said another detector of each detector pair; and a processor which identifies location of each one reference detector to a resolution which is less than a single pixel, said location determined independent of the horizontal synchronization signal and independent of said drift, wherein an edge of a horizontal scan line is inferred to occur at a time one-half way between said first time and second time for a given detector pair, said location of the reference detector of said given detector pair determined in time relative to the determined scan line edge.

15. The augmented imaging system of claim 14, wherein the processor registers the virtual image content relative to the location of at least one of the reference detectors.

16. The augmented imaging system of claim 14, further comprising:

an inertial tracker which tracks inertial movement of the scanner within the real world to define a spatial coordinate transformation between the scanner and the real world environment; and wherein the processor calibrates the inertial tracking periodically based upon the defined first detector location.

17. The augmented imaging system of claim 16, wherein the processor registers the virtual image content relative to spatial coordinate system for the real world environment based upon said spatial coordinate transformation.

18. The augmented imaging system of claim 14, in which the detector detects an amplitude of a first detector signal for multiple scan lines, and wherein the processor integrates the detected amplitude over the multiple scan lines to define the first detector location to a sub-line accuracy.

* * * * *